No. 789,321. PATENTED MAY 9, 1905.
H. GERDES.
MEANS FOR REGULATING THE AIR FEED TO GAS MOTORS.
APPLICATION FILED JUNE 25, 1902.

3 SHEETS—SHEET 1.

Witnesses:-

Inventor:-
Heinrich Gerdes

No. 789,321. PATENTED MAY 9, 1905.
H. GERDES.
MEANS FOR REGULATING THE AIR FEED TO GAS MOTORS.
APPLICATION FILED JUNE 25, 1902.

3 SHEETS—SHEET 2.

Witnesses:—

Inventor:—
Heinrich Gerdes

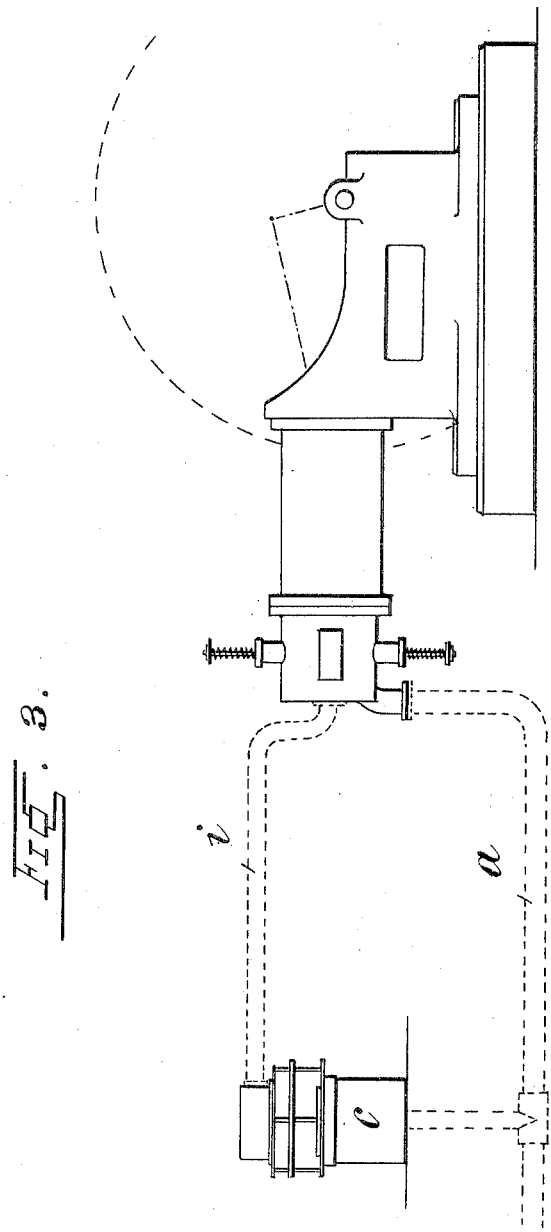

No. 789,321.

Patented May 9, 1905.

UNITED STATES PATENT OFFICE.

HEINRICH GERDES, OF BERLIN, GERMANY, ASSIGNOR TO AMERICAN SUCTION GAS PRODUCER CO., OF LANSING, MICHIGAN.

MEANS FOR REGULATING THE AIR-FEED TO GAS-MOTORS.

SPECIFICATION forming part of Letters Patent No. 789,321, dated May 9, 1905.

Application filed June 25, 1902. Serial No. 113,170.

*To all whom it may concern:*

Be it known that I, HEINRICH GERDES, a subject of the German Emperor, and a resident of Berlin, Germany, have invented certain new and useful Means for Regulating the Air-Feed to Gas-Motors, of which the following is a full, clear, and exact description.

The present invention consists of means for regulating the air-feed to the gas-motor in gas-power plant.

In connection with gas-engines it is of importance that the proportion of the air and gas pressure remains constant. The air-pressure may be greater than the gas-pressure, or vice versa, in which case the excess of pressure on one or the other side may be controlled by adjusting the position of the cocks or valves to the required mixture. In the case, however, of gas-power plants comprising two or more engines connected up to a common feed-pipe system it may easily happen that all the engines draw in or consume gas simultaneously sometimes, while at other times the consumption may take place alternately first by one motor and then by another. Under the above-mentioned circumstances the friction in the pipes, the inertia of the gasometer, or in the case of purifiers the force necessary to draw the gas through the same, causes such an amount of resistance as to render the gas-pressure very variable, in view of the different volumes taken up at different times by the engines. The pressure variations are such that they would preclude an even running of the engines unless the air-pressure is varied to correspond. This is attained by means of the present invention in that means are provided for automatically regulating the air-pressure, by means of the gas-pressure, so that any variation in the gas-pressure will immediately cause a corresponding variation in the air-pressure, and thus the proportions of the air and gas pressure will remain constant.

In order to render the present specification easily intelligible, reference is had to the accompanying drawings, in which similar letters of reference denote similar parts throughout the several views.

Figure 1:
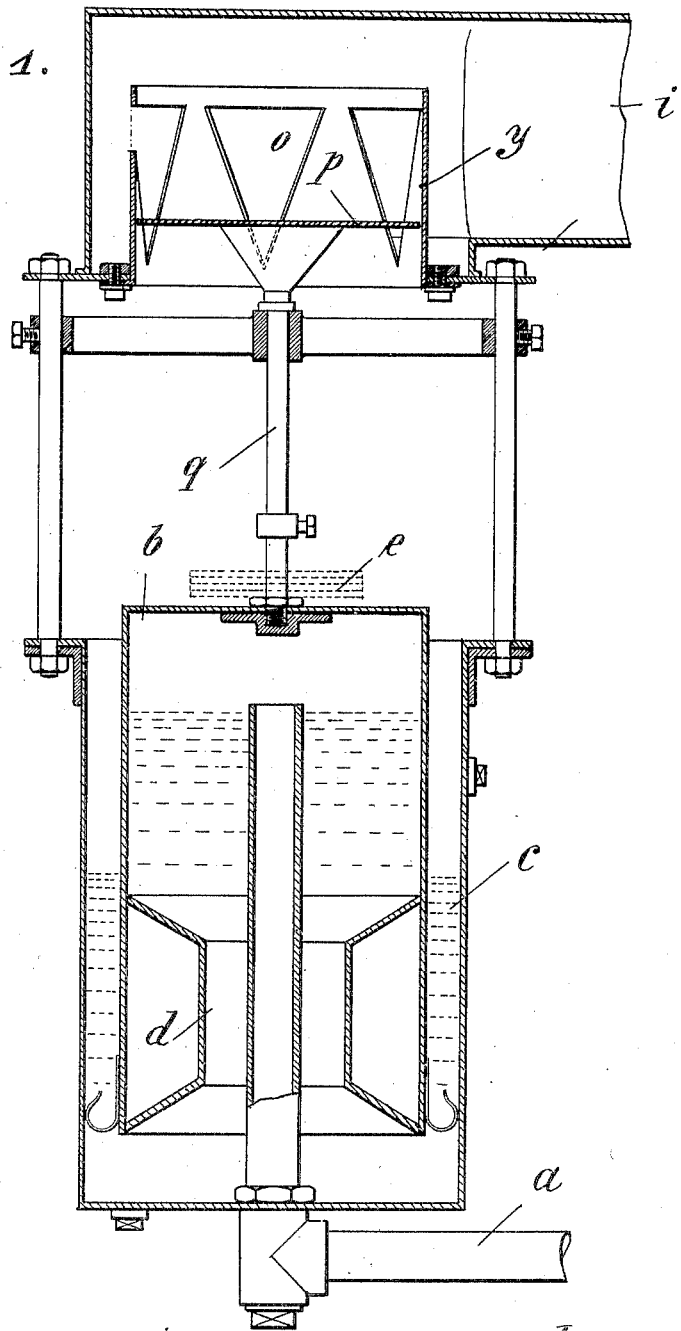
Figure 1A:
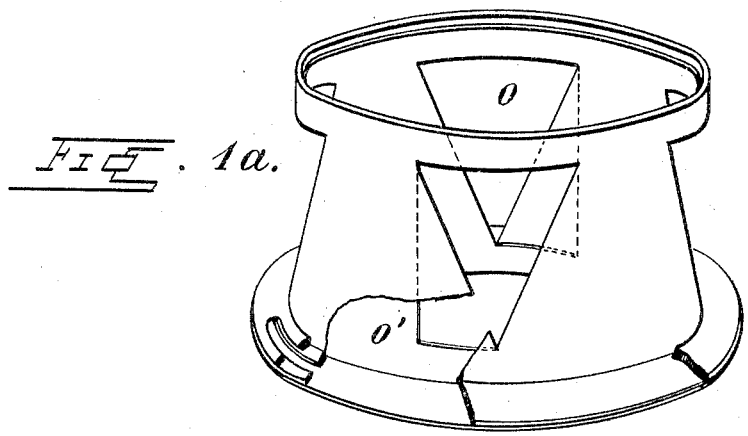
Figure 2:
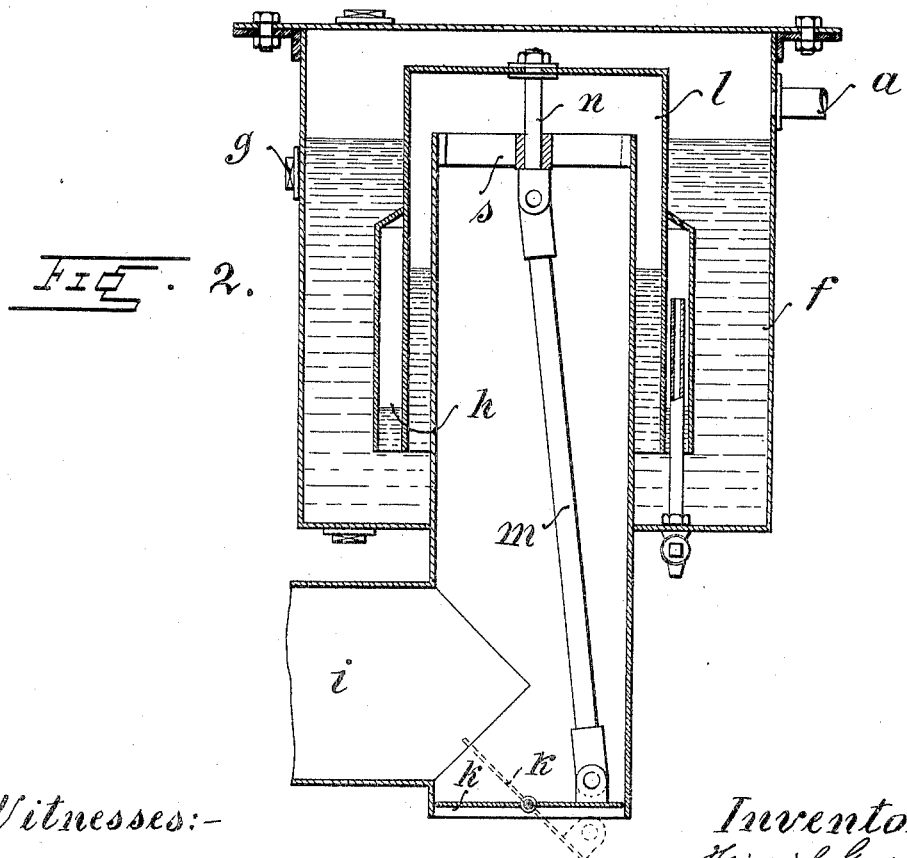

Figure 1 is a vertical section showing one form of embodying the present invention. Fig. 1$^a$ is a detailed view showing means for adjusting the air-inlets. Fig. 2 is a similar section to that of Fig. 1 of another form of embodiment, and Fig. 3 is a diagram illustrating the automatic regulating device in the feed-pipe system of a gas-power plant.

Referring first to Fig. 1, the gas-feed pipe $a$ to the engine is in open connection with the interior of a bell $b$, which is arranged to float in a housing $c$, provided with suitable liquid. If necessary, the bell may be provided with a special float, as indicated at $d$, or it may also be weighted by means of weight-disks, as at $e$. According as to whether the buoyancy of the bell is increased by the float or diminished by the load on the same at $e$ the proportion of the air and gas pressures will be determined. Rigidly attached to the top part of the bell $b$ advantageously by means of a rod $q$ is a disk $p$, which moves as the bell rises and falls in a cylinder $y$, having a series of openings $o$ in its walls, increasing in area toward the top of the same and decreasing toward the bottom. This cylinder is open at its lower end, while the upper end is in communication with the air-feed pipe $i$ to the gas-engine, so that all air passing to the engine will be forced to take its course through the part of the openings $o$ of the said cylinder which is left free beneath the disk $p$, as will be understood on reference to the figure.

The device operates in the following manner: Within the bell $b$ gas-pressure exists, it being immaterial whether the same is greater or less than the atmospheric pressure. If the gas-pressure increases, the bell will rise, taking up with it the disk $p$ and opening the air-throughlets $o$ to the engine, thus on an increase of gas-pressure insuring a corresponding increase of air-feed. If the bell sinks, the disk $p$ will also sink, closing the orifices a corresponding distance. The orifices $o$ may be regulated permanently by means of a second cylinder having corresponding orifices and revolubly mounted on the said cylinder $y$, if desirable, as illustrated in Fig. 1$^a$, in which the ring $o'$ may be turned to adjust the size of the opening $o$ and secured in position in any suitable manner. In regulating the apparatus the bell should be so adjusted that the same possesses neither buoyancy nor pressure. Thus when the engine commences to draw in gas and air by suction the pressure will sink both in the gas and the air feed pipes. Since, however, the surfaces of the disk $p$ and the float $b$ are equal, the proportion of the air to the gas-pressure will remain as originally adjusted, or otherwise the disk $p$ will be automatically adjusted to such a position in the cylinder as to render the proportions constant again.

In the modification shown in Fig. 2 the housing $f$ is closed and filled with suitable liquid up to the overflow-plug $g$. The air-pipe $i$ extends into the housing $f$ through the bottom of the same, and the air-feed to the said pipe $i$ is regulated by a throttle-valve $k$. The top of the pipe $i$ extends into the bell $l$, which may also be provided with a float arrangement, as indicated at $h$. The upper space of the housing $f$ is in connection with the gas-feed pipe to the engine by means of the pipe $a$. The bell $l$ has a downwardly-extending rod $n$, guided in a cross-piece $s$, advantageously fitted in the top of the pipe $i$, and the end of the said rod is connected by a bar $m$ to the throttle-valve, which will thus be opened and closed by the fall and rise of the bell. Thus a rise or fall of pressure in the gas in the pipe $a$ will cause the bell to sink or rise and in the former case will open the throttle-valve $k$ and in the latter case close the same, so that the air-feed will be regulated by the gas-pressure. If the air-pipe $i$ is a closed pipe—*i. e.*, a compressed-air supply—instead of being in open communication with the air, the device may be employed in connection with compressed gas and air feeds; but, generally speaking, the reference to gas and air under pressure in the present case is not intended to convey the impression of high pressure, but of a pressure of about forty or fifty millimeters water column, or, in other words, the pressure of the air and gas feed taken together must remain below the force of suction of the plunger of the engine. Otherwise with the device shown in Fig. 1 one of the fluids would escape through the opening for the other at the cylinder, as will be readily understood.

I claim as my invention—

1. A device for controlling the air-feed to a gas-motor, consisting of a throttle-valve in the air-pipe to govern the feed from the open air to the said pipe, a bell and suitable liquid-holder to contain the same, pipe connections to the said holder from the engine gas-feed to operate said bell by variations of the gas-pressure, and suitable connections between the bell and throttle-valve to diminish the air-feed when the gas-pressure decreases and vice versa, substantially as described.

2. A device for controlling the air-feed to a gas-motor, consisting of a throttle-valve in the air-pipe to govern the feed from the open air to the said pipe, a bell and suitable liquid-holder to contain the same, means for adjusting the buoyancy of the said bell, pipe connections to the said holder from the engine gas-feed to operate said bell by variations in the gas-pressure and suitable connections between the said bell and throttle-valve to diminish the air-feed when the gas-pressure decreases and vice versa substantially as described.

3. A device for controlling the air-feed to a gas-motor consisting of a throttle-valve in the air-pipe to govern the feed from the open air to the said pipe, a bell and suitable liquid-holder to contain the same, said bell and holder being located below the said throttle-valve, a gas-inlet pipe to open up from the gas-feed to the engine beneath said bell and a rod to connect the said bell to the throttle-valve substantially as described.

4. A device for controlling the air-feed to a gas-motor, consisting of a throttle-valve in the air-pipe to govern the feed from the open air to the said pipe, a bell and suitable liquid-holder to contain the same, said bell and holder being located below the said throttle-valve, a gas-pipe from the engine gas-feed opening up underneath the said bell a float attached to the bell and removable weights on the said bell to vary the buoyancy of the same substantially as described.

In witness whereof I have hereunto set my hand in presence of two witnesses.

HEINRICH GERDES.

Witnesses:
 WOLDEMAR HAUPT,
 HENRY HASPER.